United States Patent Office 3,357,944
Patented Dec. 12, 1967

3,357,944
STABILIZATION OF SYNTHETIC ORGANIC POLYMERIC SUBSTANCES WITH OXALO-BIS(SALICYLIDENE HYDRAZIDES)
Martin Dexter, Briarcliff Manor, N.Y., assignor to Geigy Chemical Corporation, Greenburgh, N.Y., a corporation of Delaware
No Drawing. Filed Nov. 26, 1963, Ser. No. 326,242
6 Claims. (Cl. 260—45.9)

This invention relates to the stabilization of materials against deterioration and, more particularly, to methods for preventing, reducing and/or retarding oxidative deterioration of synthetic organic polymeric substances as well as the stabilized compositions thus achieved.

By the term synthetic organic polymeric substances is intended such solid materials as vinyl resins, as are formed by the polymerization of vinyl halides or by the copolymerization of vinyl halides with other unsaturated and polymerizable compounds such as vinyl esters, $a,\beta$-unsaturated acids, $a,\beta$-unsaturated esters, $a,\beta$-unsaturated ketones, $a,\beta$-unsaturated aldehydes and unsaturated hydrocarbons such as butadienes and styrene; poly-$\alpha$-olefins such as polyethylene, polypropylene, polybutylene and the like, polyurethanes such as prepared from various polyols and organic polyisocyanates; polyamides such as polyhexamethylene adipamide, polyesters such as polymethylene terephthalates; as well as other copolymers such as those of acrylonitrile, butadiene and/or styrene, and the like. Such substances are often subject to oxidative deterioration, particularly when in contact with certain catalytic substances. Thus for example, while the physical and mechanical properties of polypropylene make it admirably suited for electrical insulation, it is rendered substantially unsuitable for this use by the oxidation-promoting properties of even a small amount of copper in the material being insulated. Thus it is found that the effective life of polypropylene is reduced by as much as a factor of 100 by the presence of as little as 1 or 2 percent of copper. In a like manner, synthetic organic polymeric substances are often rendered far more prone to oxidation and/or discoloration by catalytic amounts of other deteriorative substances.

Accordingly, there is provided by the present invention a method of stabilizing such synthetic organic polymeric substances by incorporating therein a stabilizing amount of an oxalo-bis-hydrazide of the formula:

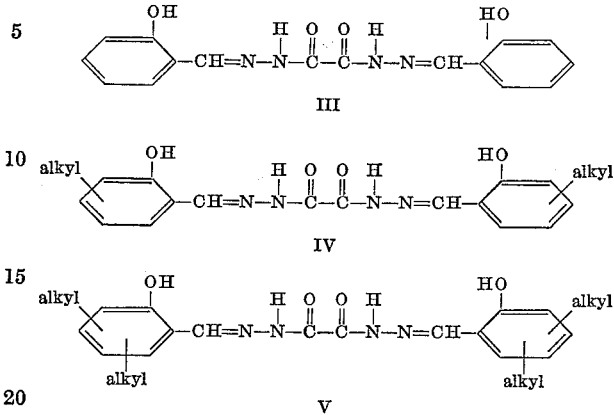

I in which each of $R_1$ and $R_2$ is hydrogen, alkyl, chloro, phenyl, or, taken together, benzo.

Also provided by the present invention are novel compositions comprising a synthetic organic polymeric substance and from about 0.01 to about 5% by weight of a compound according to Formula I, preferably from 0.01 to 1%.

Particularly valuable compounds embraced by Formula I included compounds of the formula:

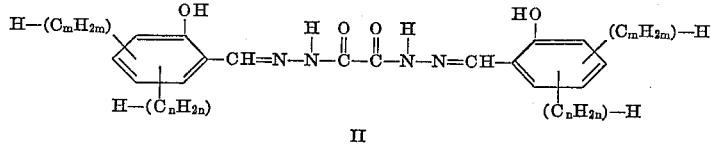

II in which each of $n$ and $m$ is an integer from 0 to 20. Thus included are compounds of the following three formulae:

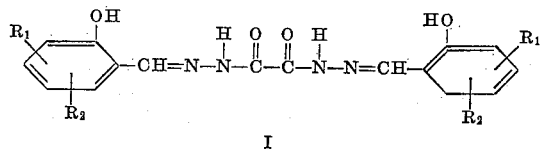

III

IV

V

By the term "alkyl" as used herein is intended a branched or straight chained hydrocarbon containing from one to twenty carbon atoms. Representative of such groups, without being limited thereby, are thus methyl, ethyl, propyl, t-butyl, pentyl, hexyl, octyl, t-octyl, decyl, tetradecyl, octadecyl, eicosyl and the like.

Compositions prepared according to the present invention may contain, in addition to compounds of the present invention, various other additives such as pigments, fillers, chelating agents, plasticizers, thermal stabilizers, ultraviolet absorbers and the like. In addition, antioxidative substances such as hindered phenols, sulfur containing alkyl esters, and the like can often be combined with the stabilizers of the present invention with superior results being observed.

The compounds employed in the methods and compositions of the present invention are prepared by allowing an o-hydroxyaromatic aldehyde of Formula VI to react with oxalodihydrazide:

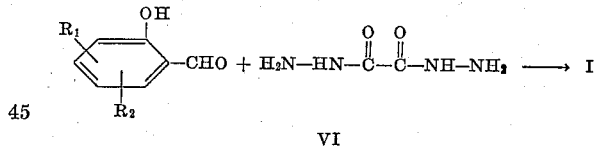

VI in which $R_1$ and $R_2$ are as defined above.

This reaction is executed by heating in a solvent such as xylene, ethylene glycol, methanol, water and the like. The desired product separates directly upon cooling or is isolated by removal of the solvent as by distillation.

The following examples, presented by way of illustration and not limitation, will further serve to typify the nature of the present invention.

Example 1

A mixture of 11.8 g. (0.1 mole) of oxalodihydrazide, 24.4 g. (0.2 mole) of salicylaldehyde and 600 ml. of ethylene glycol is heated at reflux temperature for 15 minutes. At the end of this time, the reaction mixture is allowed to cool and the solid which forms is collected by filtration, washed with methanol and dried to constant weight to yield oxalo-bis-(salicylidenehydrazide).

Example 2

Twenty grams of 4-octadecylphenol, 70 g. of hexamine and 300 ml. of glacial acetic acid are heated at steam bath temperature of 5 hours. At the end of this time and without cooling, there are added 150 ml. of conc. hydrochloric acid and 150 ml. of water. The mixture is cooled and extracted with benzene and these organic extracts then are washed with water. After removing the benzene solvent by distillation at atmospheric pressure, the residue is distilled in vacuo to yield 2-hydroxy-5-octadecylbenzaldehyde.

By substituting 74.8 g. of 2-hydroxy-5-octadecylbenzaldehyde for salicylaldehyde in the procedure of Example 1, there is obtained oxalo-bis-(2-hydroxy-5-octadecylbenzylidenehydrazide).

Example 3

In a similar fashion, the following compounds are substituted in molar equivalent amounts for salicylaldehyde in the procedure of Example 1.

2-hydroxy-5-methylbenzaldehyde
2-hydroxy-5-t-butylbenzaldehyde
2-hydroxy-3,6-dimethylbenzaldehyde
2-hydroxy-5-t-amylbenzaldehyde
2-hydroxy-3,5-di-t-butylbenzaldehyde
2-hydroxy-5-phenylbenzaldehyde
2-hydroxy-5-chlorobenzaldehyde
2-hydroxy-1-naphthaldehyde There are thus respectively obtained the following compounds:

oxalo-bis-(2-hydroxy-5-methylbenzylidenehydrazide)
oxalo-bis-(2-hydroxy-5-t-butlybenzylidenehydrazide)
oxalo-bis-(2-hydroxy-3,6-dimethylbenzylidenehydrazide)
oxalo-bis-(2-hydroxy-5-t-amylbenzylidenehydrazide)
oxalo-bis-(2-hydroxy-3,5-di-t-butylbenzylidenehydrazide)
oxalo-bis-(2-hydroxy-5-phenylbenzylidenehydrazide)
oxalo-bis-(2-hydroxy-5-chlorobenzylidenehydrazide)
oxalo-bis-(2-hydroxy-1-napthylidenehydrazide)

Example 4

Stabilized polypropylene is prepared by premixing 0.5% oxalo-bis-(salicylidenehydrazide) with powdered polypropylene with or without auxiliary stabilizers. The mixture is fluxed on a two roll mill at 180° C. for 2 minutes to thoroughly blend the stabilizer and resin. The mixture is then sheeted off, cooled and pressed into sheets, foamed or extruded in a number of shapes. By fitting the extruder with an appropriate head for example, copper wire suitable for electrical use can be coated with the thus stabilized polypropylene insulation which demonstrates unimpaired dielectric properties and excellent stability.

In a similar manner, other of the stabilizers of the present invention are employed in concentrations of from about 0.01 to about 5% for the stabilization of polypropylene. Likewise by blending such stabilizers in other synthetic organic polymeric substances and subjecting such to the usual processing procedures known to the art, superior stabilization can be realized.

As indicated above, stabilizers of this invention often exert a synergistic effect with other stabilizers, some of which are known and others which are the subjects of copending applications. Typical of these but without limiting the same are the following.

(a) dilauryl thiodipropionate
(b) n-octadecyl-3,5-di-t-butyl-4-hydroxyphenylacetate
(c) N-octadecyl-3,5-di-t-butyl-4-hydroxyphenylacetamide
(d) 2,4-bis-(n-octylthio)-6-(4-hydroxy-3,5-di-t-butylanilino)-1,3,5-triazine
(e) di-n-octadecyl-3,5-di-t-butyl-4-hydroxybenzylphosphonate
(f) 2-(4-hydroxy-3,5-di-t-butylphenoxy)-4,6-bis-(n-octylthioethylthio)-1,3,5-triazine
(g) 2,4-bis-(4-hydroxy-3,5-di-t-butylphenoxy)-6-octylthio-1,3,5-triazine
(h) 1,1,3-tris-(2-methyl-4-hydroxy-5-t-butylphenyl)butane
(i) trioctadecylphosphite
(j) benzotriazole
(k) 1,3,5-trimethyl-2,4,6-tri-(3,5-di-t-butyl-4-hydroxybenzyl)benzene It is apparent from the stabilization observed with combinations of the oxalo-bis-hydrazides of the present invention and the auxiliary stabilizers that the former can often potentiate the action of the latter. Such action is also observed with other auxiliary stabilizers when combined with the oxalo-bis-hydrazides of the present invention.

What is claimed is:

1. A composition of matter comprising a synthetic organic polymeric substance normally subject to oxidative deterioration and a stabilizing amount of a compound of the formula:

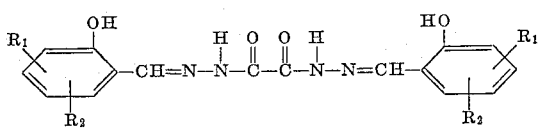

wherein $R_1$ and $R_2$ (a) taken separately are hydrogen, alkyl, chloro or phenyl and (b) taken on adjacent carbon atoms together with the ring carbon atoms of the benzene ring to which they are attached, are o-phenylene, thereby forming, with said phenyl ring, a naphthyl ring.

2. A composition of matter comprising a synthetic organic polymeric substance normally subject to oxidative deterioration in the presence of copper and a stabilizing amount of a compound of the formula:

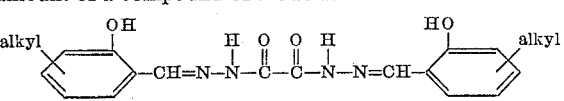

3. A composition of matter comprising a synthetic organic polymeric substance normally subject to oxidative deterioration in the presence of copper and a stabilizing amount of a compound of the formula:

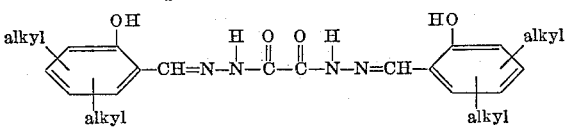

4. A composition of matter comprising a synthetic organic polymeric substance normally subject to oxidative deterioration in the presence of copper and a stabilizing amount of oxalo-bis-(salicylidenehydrazide).

5. A composition of matter according to claim 1 wherein the synthetic organic polymeric substance is a polyolefin selected from the group consisting of polypropylene and polyethylene.

6. A composition of matter comprising normally solid polypropylene and a stabilizing amount of oxalo-bis-(salicylidenehydrazide).

References Cited

UNITED STATES PATENTS 3,117,104   1/1964   Bown et al. _____ 260—45.9

DONALD E. CZAJA, *Primary Examiner.*

LEON J. BERCOVITZ, *Examiner.*

H. E. TAYLOR, JR., *Assistant Examiner.*